Aug. 15, 1961 S. P. MARCY 2,996,677
QUADRATURE SIGNAL REJECTOR
Filed April 4, 1960 3 Sheets-Sheet 1
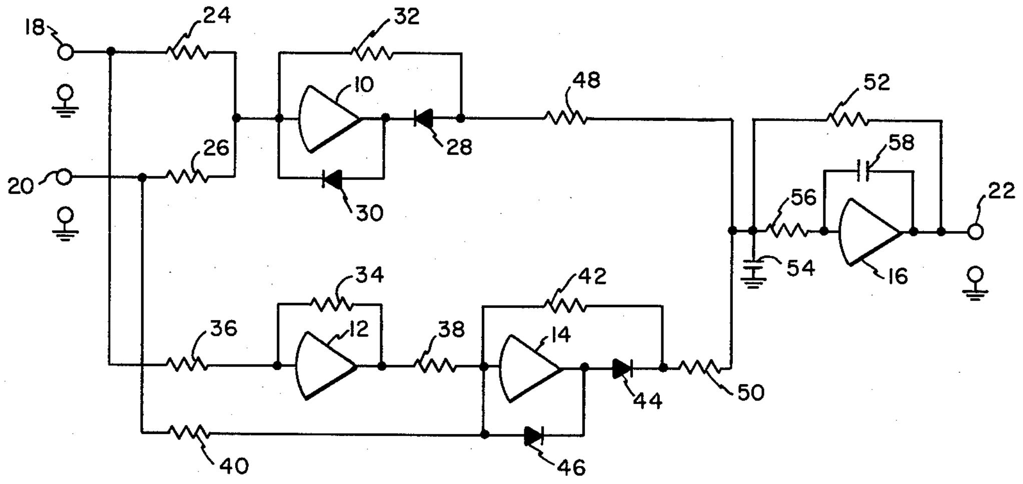
FIG. I
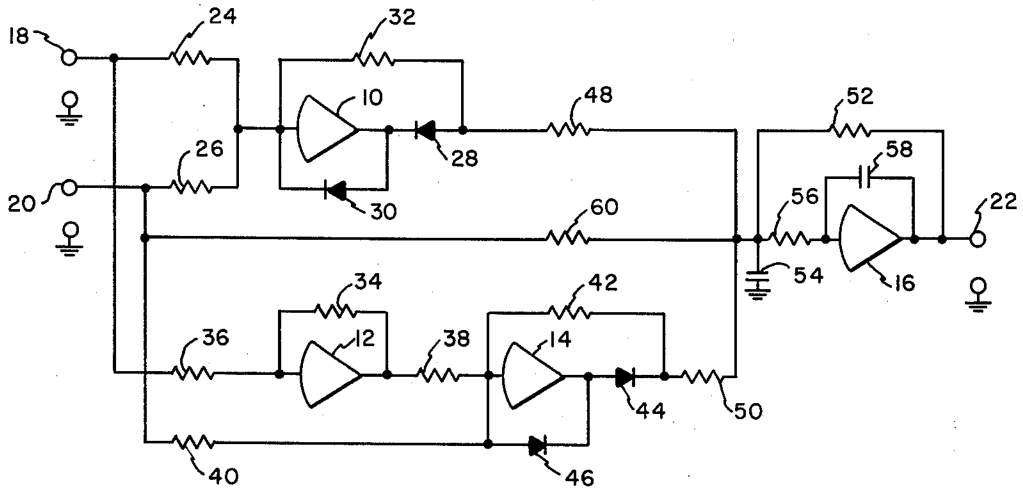
FIG. III
INVENTOR
STEPHEN P. MARCY
BY S A Potts
ATTORNEY

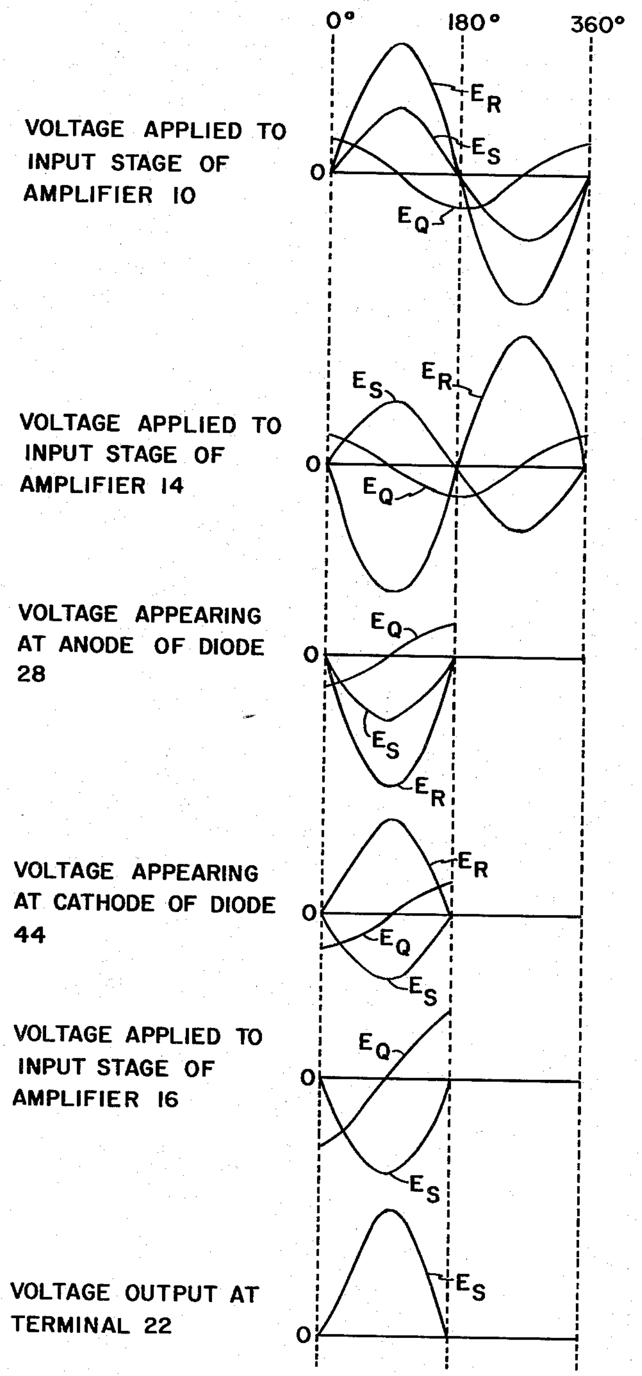
FIG. II
INVENTOR
STEPHEN P. MARCY
BY E A Peltro
ATTORNEY

Aug. 15, 1961 S. P. MARCY 2,996,677
QUADRATURE SIGNAL REJECTOR
Filed April 4, 1960 3 Sheets-Sheet 3
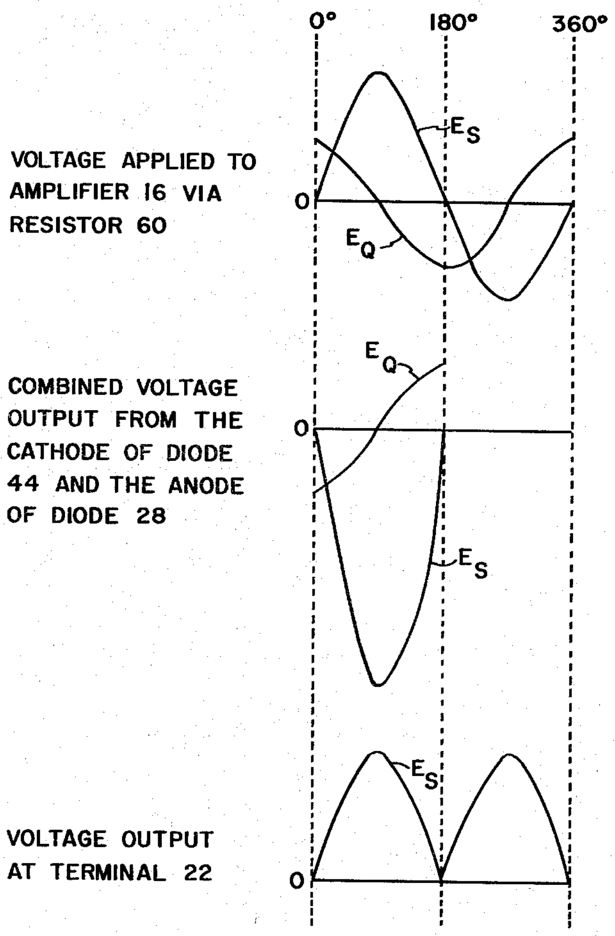
FIG. IV
INVENTOR
STEPHEN P. MARCY
BY E A Petto
ATTORNEY 2,996,677

QUADRATURE SIGNAL REJECTOR

Stephen P. Marcy, Northridge, Calif., assignor to Electronic Associates Inc., Long Branch, N.J., a corporation of New Jersey Filed Apr. 4, 1960, Ser. No. 19,679
7 Claims. (Cl. 328—134)

This invention relates generally to electronic control systems and more particularly to circuits for separating a desired signal of a particular phase and frequency from an undesired signal of the same frequency and different phase.

Present day A.C. control systems, such as may be used in conjunction with electronic computers, are complex devices which require precision adjustment of circuits and voltage supplies for successful operation. Since the frequency of the supply cannot be maintained exactly constant and since it is impossible to completely eliminate and/or effectively shield all leads between circuit components, quadrature voltages are produced. These quadrature voltages will cause sluggish operation of servomotors and inaccurate solution of problems if left uncompensated.

In order to reduce and/or eliminate quadrature voltages, prior art devices have generally resorted to the use of phase shifting transformers operating in conjunction with suitable rectification means such as diodes. Although these devices have been quite satisfactory for general purpose low frequency use, their use at higher frequencies and in electronic computers has been generally quite unsatisfactory, due primarily to the limitations imposed upon these devices by the characteristics of the transformers utilized therein. Furthermore, attempts at improving the operation of these devices by improving desirable transformer characteristics, such as balance, stray capacitance and coupling, has the effect of degrading other equally desirable transformer characteristics, such as losses and frequency band pass. Accordingly, because of this inability to effectively remove quadrature components of voltage while passing the desired signal without distortion or loss, the accuracies of certain electronic computation and control has been materially limited and, therefore, highly unsatisfactory.

The present invention contemplates the elimination of quadrature components of voltage by means which do not require the use of phase shifting transformers. Accordingly, the objectionable features occasioned by the use of transformers has been entirely eliminated and the inphase components of voltage can now be measured with accuracies compared favorably with the results achieved through the use of "Laboratory Standard" techniques.

In its preferred embodiment the present invention utilizes a source of voltage of known phase which, together with a voltage input having components of voltage of desirable and undesirable phase, is coupled to a first phase inverting amplifier channel as an input signal for half wave rectification therein. A second amplifier channel is operative to invert the phase of the voltage of known phase and its output, together with the voltage input are coupled to the input terminal of a third phase inverting amplifier channel for half wave rectification. The outputs from the first and third amplifiers are then suitably summed and inverted in phase to produce an output signal which corresponds to only the desirable phase component of voltage contained in the voltage input. Through the use of operational amplifiers and precision computing resistors the quadrature components of voltage are substantially completely eliminated without affecting the inphase component of voltage. Accordingly, it is an object of the present invention to eliminate from a desired signal of particular frequency and phase, all undesired out-of-phase signals of the same frequency without affecting the desired signal.

It is another object of this invention to remove out-of-phase components of a signal from inphase components of a signal without affecting the wave form and phase of the inphase signal.

Another object of the present invention is to provide a device for removing out-of-phase signal components from inphase signal components which is not frequency selective.

Still another object of the present invention is to provide a device for removing out-of-phase signal components from inphase signal components which has a high speed of response.

A further object of the present invention is to obtain accurately and with inexpensive means and circuitry the inphase components of a voltage which is to be measured and/or controlled.

These and other objects, features, and advantages will become apparent from the following description of this invention taken in connection with the accompanying drawing wherein:

FIG. I is a schematic representation of one embodiment of the present invention;

FIG. II is a view of a series of wave forms plotted on identical time bases to illustrate the operation of the embodiment of FIG. I;

FIG. III is a schematic representation of another embodiment of the present invention; and FIG. IV is a view of a series of wave forms plotted on identical time bases to illustrate the operation of the embodiment of FIG. III.

Reference is made to the schematic diagram of FIG. I which will be described in conjunction with the wave forms of FIG. II. In FIG. I, four amplifiers indicated as 10, 12, 14 and 16 are interposed between a pair of input terminals 18, 20 and an output terminal 22. The amplifiers 10, 12, 14 and 16 preferably have high gain, wide band characteristics and may be stabilized by any suitable means, such as the well known chopper stabilization circuit, details of which are not essential to an understanding of the present invention.

A reference signal source of known frequency and phase, not shown, is connected to the input terminal 18 to supply an input potential $E_R$, and a load circuit, not shown, which may comprise a servo-motor or suitable voltage measuring means, is connected to the output terminal 22. An input signal source, not shown, is connected to the input terminal 20 and produces inphase components of potential $E_S$ of desired frequency and phase and undesired components of potential $E_Q$ in quadrature therewith. Inphase component is used herein to mean a component of potential whose phase is either zero degrees or 180 degrees relative to the phase of the reference signal. For example, the voltage $E_S$ illustrated in FIG. II is either inphase or 180 degrees out-of-phase with the voltage reference $E_R$ but is referred to as the inphase component. The component breakdown of the voltage input and voltage output from the various amplifiers, to be described, is made for simplicity of explanation, it being understood that the actual voltage input is the sum of the inphase and quadrature phase components, and that the various amplifier outputs are a sum of the various voltage components applied thereto as input signals.

The reference signal and the input signal are coupled to the input stage of amplifier 10 via a pair of suitably proportioned resistors 24, 26. The last voltage amplifying stage of amplifier 10 is coupled, respectively, to the cathode and anode of a pair of diode elements 28, 30. The cathode of diode 30 is coupled directly to the input terminal of amplifier 10 and the anode of diode 28 is similarly coupled to the input terminal via a suitably proportioned feedback resistor 32. Amplifier 10 is operated degeneratively by the circuit thus far described to maintain its input terminal substantially at ground potential and to have an output signal which is a non-linear function of the input potentials coupled via the resistors 24, 26. The relationship, however, between the input potential and the potential appearing at the anode of diode 28 is given by the well known simplified expression $$E_0 = -\frac{R_f}{R_i} E_i$$

where $R_f$ is the resistance of the feedback resistor 32 and $R_i$ is the resistance of input resistor 24 or 26. By way of example, the ratio of $R_f/R_i$, which corresponds to the gain of the amplifier including the feedback resistor and either one of the input resistors, is selected to correspond to unity. Accordingly, the amplifier 10 including its feedback and input resistor is considered to have a gain of one and it functions as a mere phase inverting amplifier, the output of which is independent of the characteristics of the diodes 28, 30 which are disposed within the amplifier feed back loop.

Diode 28, it is apparent, will condut only when the output from amplifier 10 is negative, whereas in this condition diode 30 is rendered non-conductive. During the condition when the amplifier output is positive, diode 28 is non-conductive and diode 30 conducts to prevent amplifier 10 from operating in an open circuited condition, viz., without degenerative feedback.

It is apparent that the signal input to amplifier 10 comprises the voltage components $E_R$, $E_S$ and $E_Q$, as shown in FIG. II. Moreover, since the voltage components $E_S$ and $E_Q$ may be of an extremely small amplitude, it is essential for satisfactory operation of this device, to insure positive switching of diodes 28, 30, that the amplitude of the voltage component $E_R$ is selected to be quite large relative to the amplitude of either of the voltage component $E_S$ or $E_Q$. Diode 28 conducts only when the reference signal $E_R$ is positive and during conduction of this diode the voltage components $E_S$ and $E_Q$ are also passed by the diode to produce at its anode a halfwave signal as is shown in FIG. II.

The reference signal applied to input terminal 18 is simultaneously applied to amplifier 12, provided with a feedback resistor 34, via a resistor 36. Through proper proportioning of resistors 34, 36, amplifier 12 imparts a gain of unity to the reference signal and thus merely inverts its phase. This phase inverted signal, together with the voltage input at terminal 20, is applied to the input stage of amplifier 14 via resistors 38, 40. Amplifier 14 is provided with a feedback resistor 42 and a pair of diodes 44, 46 connected within its feedback loop. Diodes 44, 46, it is apparent, are connected in an opposite sense to diodes 28, 30. Thus, amplifier 14 produces halfwave output signals at the cathode of the diode 44, as shown in FIG. II, only when the reference signal $E_R$, coupled thereto via resistor 38, has a negative amplitude.

The output signals obtained respectively at the anode and cathode of diodes 28, 44 are applied to the input stage of amplifier 16 via the summing resistors 48, 50. It is apparent from FIG. II that the diodes 28, 44 conduct simultaneously and that the voltage signals obtained at these diodes include voltage components $E_R$ of equal amplitude and opposite phase, as well as voltage components $E_S$ and $E_Q$ of equal amplitude and the same phase. Obviously then, the reference voltage components $E_R$ will cancel, and only the voltage components $E_S$ and $E_Q$ will be applied to the input stage of amplifier 16. It should be noted that the voltage components $E_S$ and $E_Q$ applied to the input stage of amplifier 16 now occur at twice their initial amplitude.

The amplifier 16 has its last voltage amplifying stage coupled to the output terminal 22, and is provided with a feedback resistor 52 connected between its input and output terminals. Amplifier 16 has a gain of unity and merely inverts the phase of the applied signals. As is well known, the halfwave output from amplifiers 10 and 14, as influenced by the diodes 28, 44, contains components of direct current (D.C.), the fundamental of inphase component $E_S$, as well as all odd harmonics of the inphase component. For accurate measurement of the inphase component it is desirable that only the D.C. component thereof appears at output terminal 22. To achieve this end a pair of cascaded filters are included within the feedback loop of amplifier 16.

These filters comprise a first T network which includes the resistor 52 and a capacitor 54, and a second T network which includes a resistor 56 and a capacitor 58. Capacitor 54 is connected between the junction of the summing resistors 48, 50 and a point of fixed potential, such as ground, and the capacitor 58 is connected in shunt circuit with the amplifier 16. Resistor 56 is connected between the junction of summing resistors 48, 50 and the input stage of the amplifier 16.

Each of the T networks are selected to pass only the D.C. portion of the inphase component, and attenuate or reject the fundamental and/all odd harmonics of the inphase component, as is well known, by proper matching and determination of the network characteristics. Moreover, the T network characteristics should be adjusted to be commensurate with resquired frequency band pass and response characteristics as determined by the characteristics of the input inphase component $E_S$.

As is well known, the T networks will integrate an applied A.C. signal. The quadrature component $E_Q$ applied to the T networks, as is apparent in FIG. II, is symmetrical about the point of zero potential and accordingly, when integrated by the T networks is substantially completely eliminated from the inphase component $E_S$. Thus, the potential output appearing at terminal 22 comprises a halfwave rectified reproduction of the inphase component which occurs at twice its initial input amplitude and which corresponds in terms of an average D.C. signal to its initial amplitude.

In order to compensate for inaccuracies such as phase shift in the inphase component, each of the resistors in FIG. I may be suitably padded with appropriate capacitors, not shown.

The embodiment of FIG. III embodies the principles of the embodiment of FIG. I and produces output signals which correspond to full wave rectified reproductions of the inphase component $E_S$. In the description of FIG. III, made in conjunction with FIG. IV, the same reference numerals will be used to indicate the same or similar components while different reference numerals will be used to indicate dissimilar components. Thus, as in the embodiment of FIG. I, the input terminals 18, 20 are similarly connected to similar amplifiers 10, 12 and 14. The relationship between the input and feedback resistors for amplifiers 10 and 14 is, however, such as to cause these amplifiers to have a gain of two, causing the output signals at the diodes 28, 44 to occur at twice their initial amplitude.

The input terminal 20 is further connected directly to the junction of resistors 52, 56 via an input resistor 60. The ratio of resistors 52 and 60 is such as to cause amplifier 16 to impart a gain of two to the signal applied via the resistor 60. The ratio of resistor 48 and 52 as well as the ratio of resistors 50 and 52 is such as to cause amplifier 16 to impart a gain of one to the signals applied via the resistors 48 and 50. Thus, as applied to amplifier 16 via the resistor 48 and 50, the reference component $E_R$ will cancel out. The inphase component $E_S$ obtained via resistors 48 and 50 has twice the amplitude and an opposite phase to the corresponding inphase component $E_S$ obtained via resistor 60. The net affect of these combined inphase components is to produce a full wave rectified input to the amplifier 16 which has the same amplitude as in the initial condition of the inphase component $E_S$.

The T networks in this embodiment are selected to pass only the D.C. component of the inphase component $E_S$, and to attenuate or reject the even harmonic signals that are present in the inphase component obtained via resistors 48 and 50. Similarly, the time constant characteristics of these T networks are selected to correspond to desired band pass and frequency response characteristics as determined by the characteristics of the input inphase component $E_S$. The quadrature component $E_Q$, as in the embodiment of FIG. I, when integrated by the T networks, is cancelled from the inphase component $E_S$ and is thus effectively eliminated. The inphase component $E_S$ is inverted in phase by the amplifier 16 and appears at the output terminal thereof as a D.C. component, the average amplitude of which corresponds to the initial amplitude of the input inphase component $E_S$.

As in the embodiment of FIG. I, each of the resistors in the embodiment of FIG. III are provided with suitable padding capacitors, not shown, which compensate for phase shifts imparted to the signals by these resistors. In addition to completely eliminating quadrature components of potential from desired inphase components of potential, the averaging or integrating action of these systems also substantially completely eliminates any noise components of potential which may be present in the signals. Accordingly, the output signals present at the output terminals 22 represent the D.C. component of the input inphase component $E_S$ as accurately as it is physically possible and/or appropriate to accurately match the resistance values of the various resistors shown in these embodiments. Moreover, the band pass and response characteristics of these systems can be readily varied by the addition of appropriate T networks in tandem with the T networks that are shown.

While only two embodiments of the present invention have been shown and described herein and inasmuch as this invention is subject to many variations, modifications and reversals of parts, it is intended that all material contained in the above description shall be interpreted as illustrative and not in a limiting sense.

I claim:

1. In an electrical control system having a voltage input which includes a desirable phase component of voltage and an undesirable phase component of voltage, the combination comprising a voltage source of known phase, means for algebraically combining the voltage input and said voltage of known phase to produce a first voltage signal, means for inverting the phase of said first voltage signal and responsive to only one polarity thereof, means for inverting the phase of said known voltage and for algebraically combining same with the input voltage to produce a second voltage signal, means for inverting the phase of said second voltage signal and responsive to only one polarity thereof, and means algebraically combining the unipolar components of said first and second voltage signals to obtain only the desirable phase component of the voltage input.

2. In an electrical control system having a voltage input which includes a desirable phase component of voltage and a component of voltage out of phase therewith, the combination comprising a voltage source of known phase, first means for summing the voltage input and the voltage of known phase, first halfwave rectification means for inverting the phase of an applied signal and coupled to receive the output signal from said first summing means, means for inverting the phase of said voltage of known phase, second means for summing the voltage input and the output signal from said inverting means, second halfwave rectification means for inverting the phase of an applied signal and coupled to receive the output signal from said second summing means, and means operatively connected to said first and second halfwave rectification means for summing the output signals therefrom and for producing an output signal which corresponds only to the desirable phase component of the voltage input.

3. In an electrical control system having a voltage input which includes a desirable phase component of voltage and a component of voltage out of phase therewith, the combination comprising a source of voltage of known phase, a first phase inverting amplifier channel coupled to receive as an input signal the voltage input and voltage of known phase and adapted to be responsive to only one phase thereof, a second phase inverting amplifier channel coupled to receive the voltage input, a third phase inverting amplifier channel coupled to receive as an input signal the voltage input and the voltage output from said second phase inverting amplifier and adapted to be responsive to only one phase thereof, and means including algebraic summation means coupled to received as an input signal the voltage input and the output signals from said first and third amplifier channels to obtain only the voltage components of desirable phase.

4. In an electrical control system having a voltage input which includes a desirable phase component of voltage and a component of voltage out of phase therewith, the combination comprising first amplifier means responsive only to voltage signals of one polarity and coupled to receive as an input signal the voltage input and a reference voltage of known phase, said amplifier means being adapted to produce an output voltage of opposite phase which corresponds to the algebraic summation of the input voltage and the known voltage, second amplifier means coupled to the known voltage for inverting the phase thereof, third amplifier means responsive only to voltage signals of one polarity and coupled to receive as an input signal the voltage input and the output voltage from said second amplifier means, said third amplifier means being adapted to produce an output voltage of opposite phase which corresponds to the algebraic summation of the input voltage and the output voltage from said second amplifier means, and means operatively connected to said first and third amplifier means for combining algebraically the output voltages therefrom to produce a voltage corresponding only to the desirable phase component of the voltage input.

5. In an electrical control system having a voltage input which includes a desirable phase component of voltage and a component of voltage out of phase therewith, the combination comprising a source of voltage of known phase, a first phase inverting amplifier channel coupled to receive as an input signal the voltage input and voltage of known phase and adapted to be responsive to only one phase thereof, a second phase inverting amplifier channel coupled to receive the voltage input, a third phase inverting amplifier channel coupled to receive as an input signal the voltage input and the voltage output from said second phase inverting amplifier and adapted to be responsive to only one phase thereof, means for algebraically summing the voltage input and the output signals from said first and third amplifier channels, and means coupled to said summing means for obtaining only the desirable phase component of the voltage input.

6. In an electrical control system having a voltage input which includes a desirable phase component of voltage and a component of voltage out of phase therewith, the combination comprising a source of voltage of known phase, a first phase inverting amplifier channel coupled to receive as an input signal the voltage input and voltage of known phase and adapted to be responsive to only one phase thereof, a second phase inverting amplifier channel coupled to receive said voltage of known phase, a third phase inverting amplifier channel coupled to receive as an input signal the combined voltage input and the voltage output from said second phase inverting amplifier and adapted to be responsive to only one phase thereof, means for algebraically summing the voltage input and the output signals from said first and third amplifier channels, and a fourth phase inverting amplifier channel including filter means for obtaining only the direct current component of the desirable phase component of the voltage input.

7. In an electrical control system having a voltage input which includes a desirable phase component of voltage and a component of voltage in quadrature therewith, the combination comprising a voltage source of known phase, first means for algebraically combining the voltage input and said voltage of known phase to produce a first voltage signal, first means for inverting the phase of the first voltage signal and responsive only to one polarity thereof, second means for inverting the phase of said voltage of known phase, second means for algebraically combining the phase inverted voltage of known phase and the voltage input to produce a second voltage signal, third means for inverting the phase of said second voltage signal and responsive only to one polarity thereof, third means for algebraically combining the output signals from said first and second inverting means, and third means including filter means operatively connected to said third combining means for inverting the phase of the signal obtained therefrom.

No references cited.